(12) United States Patent  
Masuda

(10) Patent No.: US 10,656,069 B2  
(45) Date of Patent: May 19, 2020

(54) FLOW CELL AND MEASUREMENT DEVICE

(71) Applicant: ARKRAY, Inc., Kyoto-shi, Kyoto (JP)

(72) Inventor: Shigeki Masuda, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 0 days.

(21) Appl. No.: 16/012,927

(22) Filed: Jun. 20, 2018

(65) Prior Publication Data

US 2018/0372612 A1 Dec. 27, 2018

(30) Foreign Application Priority Data

Jun. 27, 2017 (JP) ................................. 2017-125413

(51) Int. Cl.
  *G01N 15/14* (2006.01)
  *B01L 3/00* (2006.01)

(52) U.S. Cl.
  CPC ....... *G01N 15/1404* (2013.01); *G01N 15/147* (2013.01); *G01N 15/1484* (2013.01);
  (Continued)

(58) Field of Classification Search
  CPC ....... G01N 15/1404; G01N 2015/1413; G01N 2015/1411; G01N 2015/1409
  See application file for complete search history.

(56) References Cited

U.S. PATENT DOCUMENTS

| | | | | |
|---|---|---|---|---|
| 8,120,770 B2* | 2/2012 | Huang | ................ | B01F 13/0062 |
| | | | | 209/208 |
| 8,795,500 B2* | 8/2014 | Shinoda | ................ | B01L 3/0268 |
| | | | | 204/600 |

(Continued)

FOREIGN PATENT DOCUMENTS

| | | | |
|---|---|---|---|
| EP | 2 003 438 A2 | 12/2008 | |
| EP | 2003438 A2 | 12/2008 | |

(Continued)

OTHER PUBLICATIONS

Extended European Search Report (EESR) issued by the European Patent Office dated Nov. 13, 2018, which corresponds to European Patent Application No. 18 17 8803.5.

(Continued)

*Primary Examiner* — Hina F Ayub  
*Assistant Examiner* — Rebecca C Bryant  
(74) *Attorney, Agent, or Firm* — Studebaker & Brackett PC

(57) ABSTRACT

A flow cell including a flow channel through which a sample fluid and a sheath fluid flow, a sample flow channel that introduces the sample fluid into the flow channel, and at least one sheath flow channel that introduces the sheath fluid into the flow channel. The flow channel includes a flow merging section where the sample flow channel and the sheath flow channel merge, a flattened section that is disposed downstream of the flow merging section, that is formed in line with one wall face of wall faces facing across the flow merging section, and that is shallower in depth than the flow merging section, and a tapered section that connects the flow merging section with the flattened section and that gradually decreases in depth on progression downstream. The sample flow channel introduces the sample fluid into the flow merging section along the one wall face of the wall faces facing across the flow merging section, and the sheath flow channel introduces the sheath fluid into the flow merging section from a direction such that the sheath fluid flows so as to press the sample fluid against the one wall face.

7 Claims, 12 Drawing Sheets

(52) U.S. Cl.
CPC ....... *B01L 3/5027* (2013.01); *B01L 3/502776* (2013.01); *G01N 2015/1413* (2013.01)

(56) References Cited

U.S. PATENT DOCUMENTS

| | | | |
|---|---|---|---|
| 2004/0266022 A1* | 12/2004 | Sundararajan | B01F 13/0062 436/180 |
| 2005/0123450 A1* | 6/2005 | Gilbert | B01L 3/502776 422/81 |
| 2006/0023207 A1* | 2/2006 | Cox | G01N 15/1404 356/246 |
| 2014/0273192 A1 | 9/2014 | Sharpe et al. | |
| 2017/0059459 A1* | 3/2017 | McPeak | B01L 3/502715 |
| 2017/0299492 A1* | 10/2017 | Rindorf | B01L 3/502776 |
| 2018/0313740 A1* | 11/2018 | Otsuka | G01N 15/14 |

FOREIGN PATENT DOCUMENTS

| | | | | |
|---|---|---|---|---|
| EP | 2 191 895 A1 | 6/2010 | | |
| EP | 2191895 A1 | 6/2010 | | |
| JP | 2006-506648 A | 2/2006 | | |
| WO | WO2008125081 | * 10/2008 | ............. | G01N 15/14 |

OTHER PUBLICATIONS

Extended European Search Report issued by the European Patent Office dated Nov. 13, 2018, which corresponds to EP18178803.5-1001 and is related to U.S. Appl. No. 16/012,927.

* cited by examiner

FLOW CELL AND MEASUREMENT DEVICE

CROSS-REFERENCE TO RELATED APPLICATION

This application is based on and claims the benefit of priority of the prior Japanese Patent Application No. 2017-125413, filed on Jun. 27, 2017, the entire contents of which are incorporated herein by reference.

FIELD

The embodiments discussed herein are related to a flow cell and a measurement device.

BACKGROUND

Patent Document 1 (JP-A No. 2006-506648) discloses a flow cell related to a flow cytometer for analyzing particles in a sample fluid, in which a sample is caused to flow in the center of a sheath fluid using a cannula. In this flow cell, the sheath fluid and the sample fluid are merged and flow together, the fluid as a whole is pressed and flattened by a narrow flow channel at the downstream of the flow cell, and the sample fluid is imaged with a camera.

In the configuration disclosed in Patent Document 1 (JP-A No. 2006-506648), the sample fluid and the sheath fluid mix together at a flow merging point. After that, even if fluid is constricted, there is a possibility that part of the sample fluid lies outside the focal range of the optical system, which is referred to as the photographic depth of field. Moreover, in this configuration, a pump system is required in order to control fluids at high precision, with the device itself becoming complicated and costly. Moreover, due to there being a lot of sheath fluid between the sample and the camera, the optical distortion due to flow in the sheath fluid and the like is also captured at the same time, leading to a detrimental effect on the captured images. Moreover, due to the large volume of the flow cell, a lot of sheath fluid is consumed, and the structure of the flow cell is complicated, raising production costs.

SUMMARY

In consideration of the above circumstances, an object of the present disclosure is to obtain a flow cell and a measurement device that are capable of acquiring clear images of a sample while suppressing a sample fluid from mixing with a sheath fluid.

A flow cell according to the present disclosure includes a flow channel, a sample flow channel, and at least one sheath flow channel. A sample fluid and a sheath fluid flow through the flow channel. The sample flow channel introduces the sample fluid into the flow channel. The at least one sheath flow channel introduces the sheath fluid into the flow channel. The flow channel includes a flow merging section, a flattened section, and a tapered section. The flow merging section is where the sample flow channel and the sheath flow channel merge. The flattened section is disposed downstream of the flow merging section, is formed in line with one wall face of wall faces facing across the flow merging section, and is shallower in depth than the flow merging section. The tapered section connects the flow merging section with the flattened section and gradually decreases in depth on progression downstream. The sample flow channel introduces the sample fluid into the flow merging section along the one wall face of the wall faces facing across the flow merging section. The sheath flow channel introduces the sheath fluid into the flow merging section from a direction such that the sheath fluid flows so as to press the sample fluid against the one wall face.

In the flow cell according to the present disclosure, the sample flow channel may be provided in line with one wall face of a pair of wall faces facing across the flow merging section, and the sheath flow channel may be provided in line with another wall face of the pair of wall faces facing across the flow merging section.

In the flow cell according to the present disclosure, a ratio of flow rates between the sample fluid and the sheath fluid may be from 1:20 to 1:40.

In the flow cell according to the present disclosure, the sheath flow channel may include a first sheath flow channel and a second sheath flow channel that introduce the sheath fluid into the flow channel.

In the flow cell according to the present disclosure, the first sheath flow channel and the second sheath flow channel may share a common sheath intake port, at least one bend may be formed partway along the first sheath flow channel and partway along the second sheath flow channel, and a bend in front of the flow merging section may bend around at an acute angle, and a downstream side of the bend is arranged along a direction intersecting with a flow channel direction of the sample fluid.

A measurement device according to the present disclosure includes the flow cell of the present disclosure, an imaging mechanism, a sample supply mechanism, and a sheath supply mechanism. The imaging mechanism is disposed so as to face the flow cell where the sheath fluid presses the sample fluid against the one wall face, and images the sample fluid flowing in the flattened section. The sample supply mechanism supplies the sample fluid to the sample flow channel. The sheath supply mechanism supplies the sheath fluid to the sheath flow channel.

In the measurement device according to the present disclosure, in the flattened section imaged by the imaging mechanism, the sample fluid may flow in contact with one wall face of the flattened section.

In the measurement device according to the present disclosure, configuration may be made such that in the flattened section imaged by the imaging mechanism, the sheath fluid is not interposed between the one wall face of the flattened section and the sample fluid.

According to the flow cell and the measurement device of the present disclosure, clear images of a sample can be acquired while suppressing a sample fluid from mixing with a sheath fluid, and particles in the sample can be analyzed with good precision.

DESCRIPTION OF EMBODIMENTS

Figure 1:
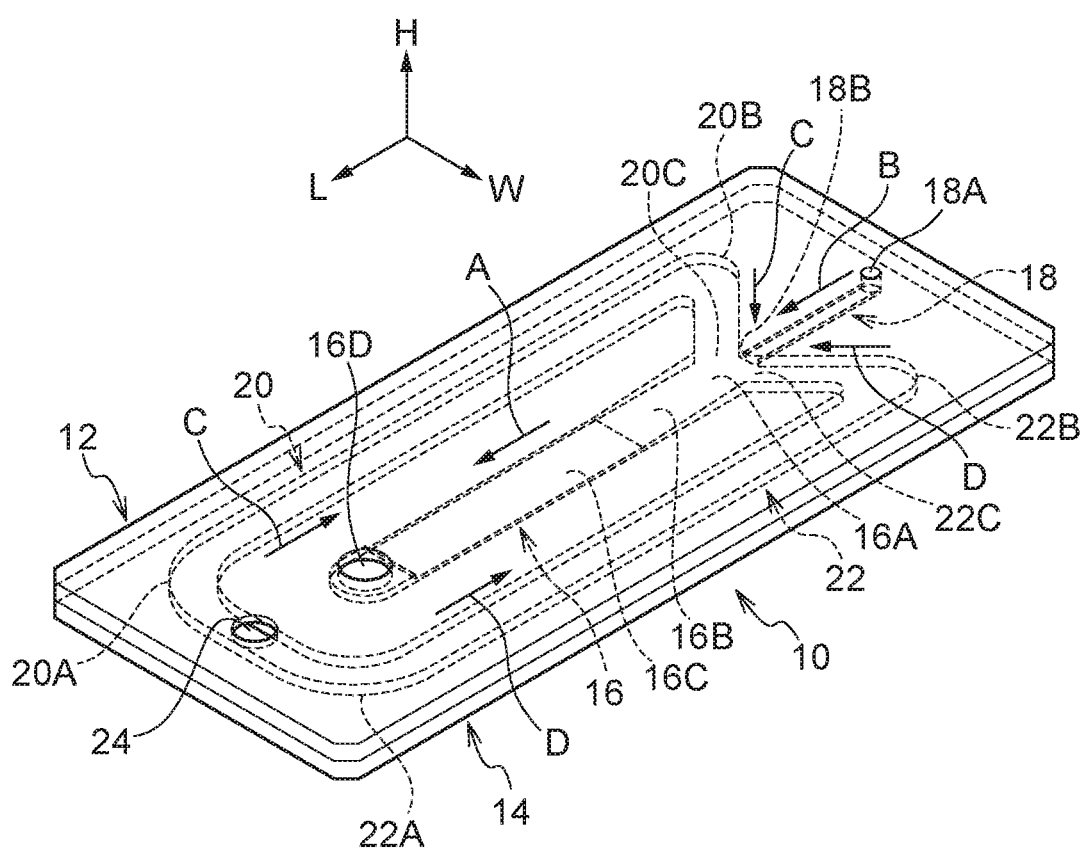
FIG. 1 is a perspective view illustrating a flow cell according to a first embodiment.

Explanation follows regarding embodiments of the present disclosure, with reference to the drawings. Note that in the drawings an arrow H indicates a height direction of a flow cell, and an arrow W indicates a width direction of a flow cell, as appropriate. Moreover, in the drawings an arrow L indicates a length direction of a flow cell, this being orthogonal to both the height direction and the width direction (in the present example, the arrow L points downstream in a flow direction of a flow channel after a sheath fluid and a sample fluid have merged). Moreover, in the drawings an arrow UP indicates upward in an up-down direction of the measurement device, as appropriate. Moreover, in the present specification, when "to" is employed in expressing a range of numerical values, this means a range that includes the numerical values before and after "to" as the lower limit and upper limit of the range.

First Embodiment

Explanation follows regarding a flow cell of a first embodiment of the present disclosure, and a measurement device to image a sample fluid in the flow cell, with reference to FIG. 1 to FIG. 11.

Flow Cell Configuration

Figure 2:
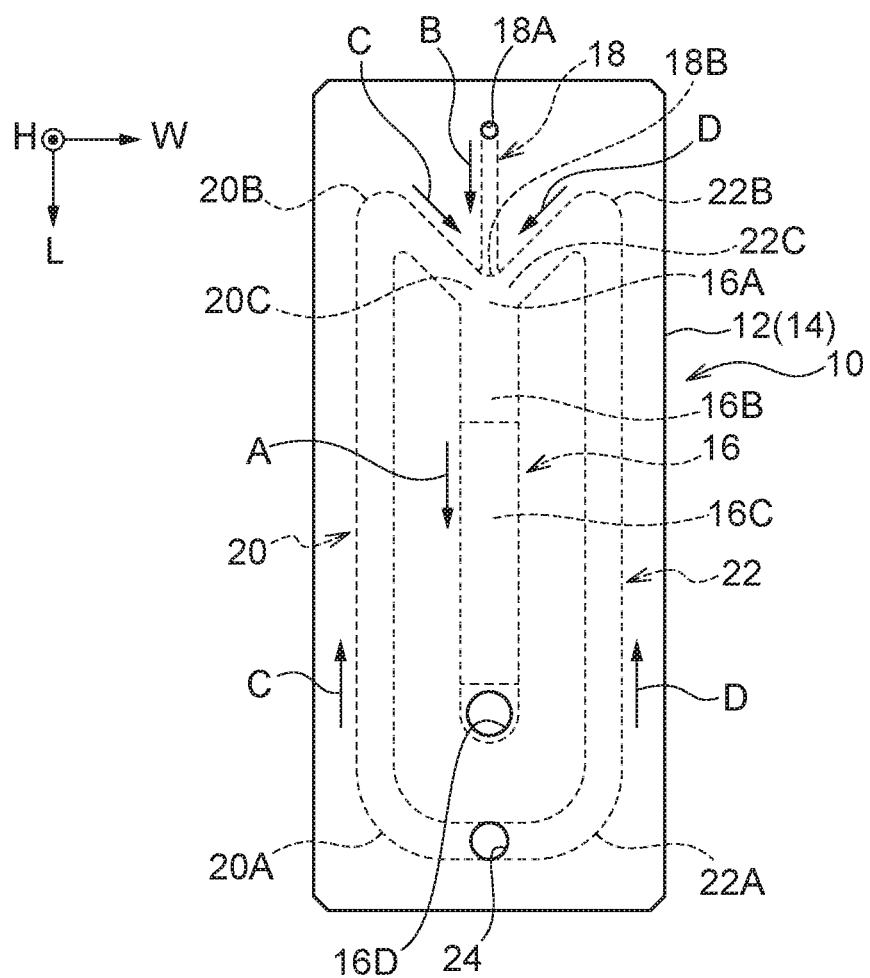
FIG. 2 is a plan view illustrating a flow cell according to the first embodiment.
Figure 3:
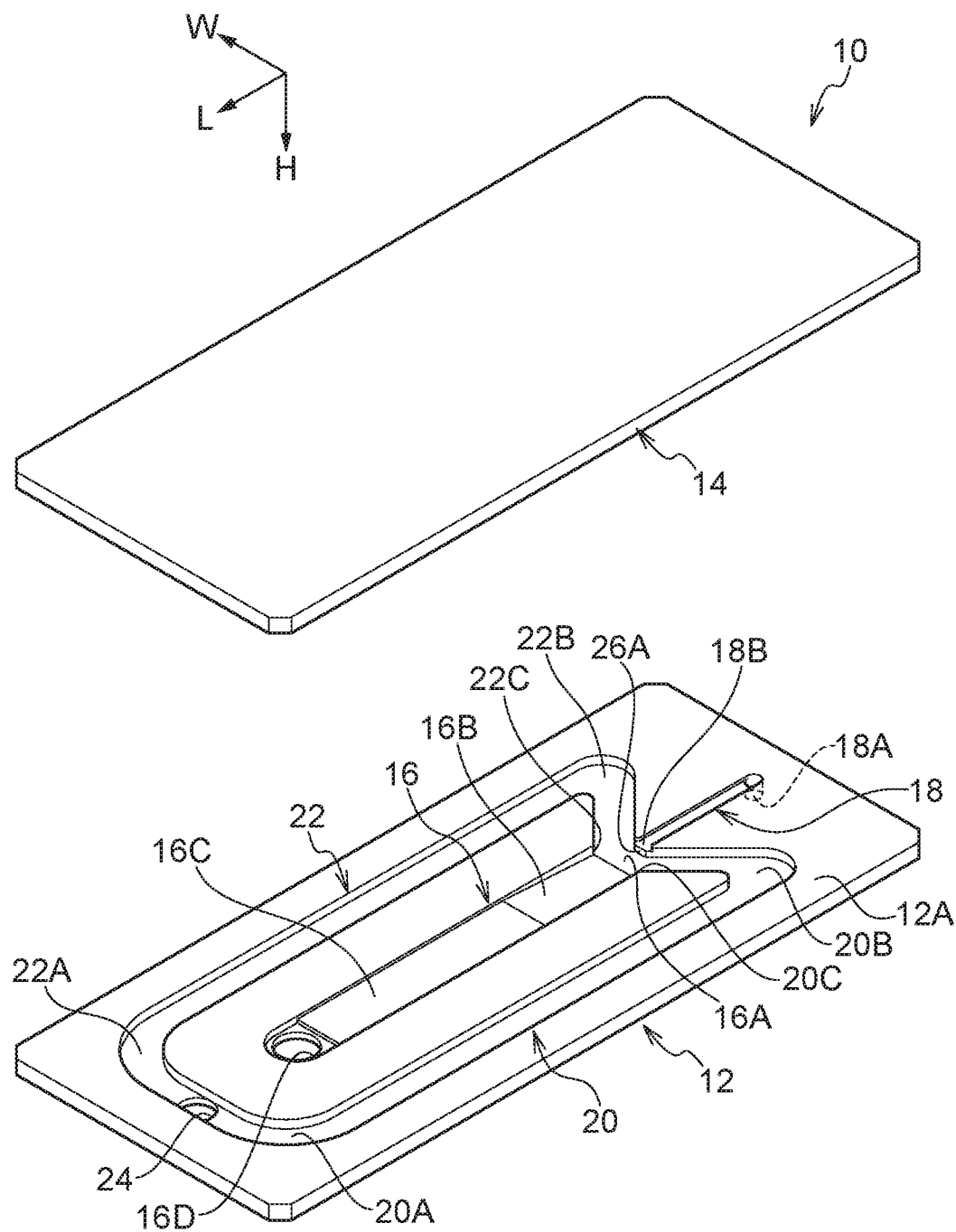
FIG. 3 is an exploded perspective view illustrating a flow cell according to the first embodiment.
Figure 4:
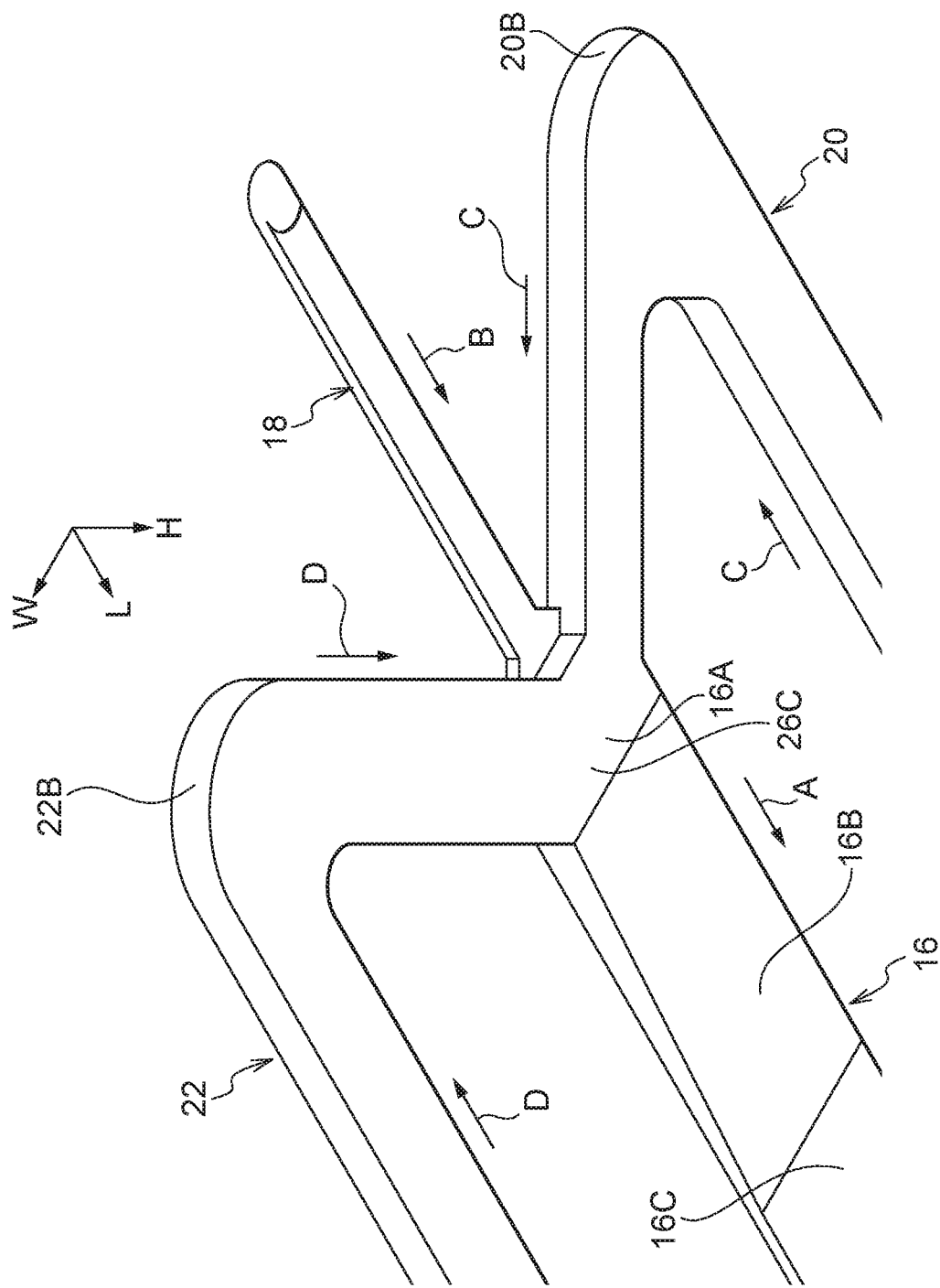
FIG. 4 is a perspective view of a flow cell according to the first embodiment, illustrating an enlargement at the vicinity of a flow merging section where flows of a sample fluid and a sheath fluid merge.

FIG. 1 is a perspective view illustrating a flow cell 10 of the first embodiment, and FIG. 2 is a plan view illustrating the flow cell 10. FIG. 3 is an exploded perspective view illustrating the flow cell 10. FIG. 4 is an enlarged perspective view illustrating the vicinity of a flow merging section 16A, described later, of the flow cell 10. Note that in order to facilitate understanding of the configuration of the flow cell 10, in FIG. 3 and FIG. 4 the height direction (i.e. direction H), namely the up-down direction, is illustrated in an inverted state compared to FIG. 1 and FIG. 2.

The flow cell 10 of the first embodiment is, for example, a flow cell into which a sheath fluid, and a urine sample, serving as an example of a sample fluid, are introduced. The flow cell 10 is employed in a urine physical matter component test in which physical matter components of the urine sample are imaged using an imaging mechanism of a measurement device, and the shape and the like of the physical matter components in images taken are analyzed. In the first embodiment, a urine sample is, for example, employed as the sample fluid, and an in-urine physical matter component test is performed. However, the first embodiment may be employed in applications in which the sample is a blood fluid, cells, a body fluid, or the like.

As illustrated in FIG. 1 to FIG. 3, the flow cell 10 is a plate shaped member having a substantially rectangular profile. In the first embodiment, the flow cell 10 has a configuration in which a first plate shaped body 12 and a second plate shaped body 14 are stuck together in a surface-to-surface contact state. The flow cell 10 includes a flow channel 16 through which a sample fluid 2 and a sheath fluid 4 flow (see FIG. 6), and a sample flow channel 18 (see FIG. 3). The sample flow channel 18 is provided on an extension line of the length direction of a flow channel 16, upstream in a flow direction of the flow channel 16 indicated by arrow A (i.e. on the opposite side to direction L), and the sample fluid 2 (see FIG. 6) flows through the sample flow channel 18. The flow cell 10 also includes a first sheath flow channel 20 disposed so as to intersect with the length direction of the flow channel 16 upstream in the flow direction of the flow channel 16 (i.e. the arrow A direction). A sheath fluid 4 (see FIG. 6) flows through the first sheath flow channel 20. Moreover, the flow cell 10 also includes a second sheath flow channel 22 disposed so as to intersect with the length direction of the flow channel 16 upstream in the flow direction of the flow channel 16 (i.e. the arrow A direction) on the opposite side to the first sheath flow channel 20. The sheath fluid 4 (see FIG. 6) flows through the second sheath flow channel 22.

The flow channel 16, the sample flow channel 18, the first sheath flow channel 20, and the second sheath flow channel 22 are provided in the first plate shaped body 12 (see FIG. 3). Note that in FIG. 3, due to the flow cell 10 being illustrated in an up-down direction inverted state to that of FIG. 1 and FIG. 2, as previously mentioned, the positional relationship between the first sheath flow channel 20 and the second sheath flow channel 22 is inverted compared to that of FIG. 1 and FIG. 2. In the first embodiment, the flow channel 16, the sample flow channel 18, the first sheath flow channel 20, and the second sheath flow channel 22 are formed by grooving a face 12A on one side of the first plate shaped body 12 (see FIG. 3). The second plate shaped body 14 is a plate member with substantially flat parallel faces on the top and bottom thereof, namely is not formed with a flow channel or the like (see FIG. 3).

The sample flow channel 18 has a configuration arranged in a substantially straight line shape along the length direction of the flow cell 10, and the sample fluid 2 (see FIG. 6) flows through the sample flow channel 18 in an arrow B direction. In the first embodiment, the sample flow channel 18 has a substantially rectangular profile in a cross-section taken along a direction orthogonal to the length direction of the sample flow channel 18. An intake port 18A is formed at an upstream end of the sample flow channel 18 in the flow direction (i.e. the arrow B direction), and the sample fluid 2 is supplied through the intake port 18A. A supply tube (not illustrated in the drawings) to supply the sample fluid 2 (see FIG. 6) is connected to the intake port 18A of the sample flow channel 18. The sample flow channel 18 is configured such that the sample fluid 2 supplied through the intake port 18A flows in a direction toward the flow channel 16.

The first sheath flow channel 20 is a path having a shape that is a substantially U-shape disposed widthwise along the length direction of the flow cell 10 in plan view, with the open side of the substantially U-shaped profile pointing along a width direction (i.e. a direction W) of the flow cell 10. The first sheath flow channel 20 is formed at a location to one side in the width direction (i.e. the direction W) of the flow cell 10. In the first embodiment, the first sheath flow channel 20 has a substantially rectangular profile in a cross-section taken along a direction orthogonal to the length direction of the first sheath flow channel 20.

The first sheath flow channel 20 is configured such that the sheath fluid 4 (see FIG. 6) flows in an arrow C direction. A sheath intake port 24 is formed at the upstream end of the first sheath flow channel 20 in the flow direction (i.e. the arrow C direction). The sheath fluid 4 is supplied through the sheath intake port 24. In other words, the first sheath flow channel 20 is configured such that the sheath fluid 4 supplied through the sheath intake port 24 flows in a direction toward the upstream side of the flow channel 16. There are two bends 20A, 20B formed partway along the flow direction of the first sheath flow channel 20. The bend 20A at the upstream side of the first sheath flow channel 20 in the flow direction bends around at substantially a right angle, and is formed such that a corner of the bent portion is a rounded curve. The bend 20B in the first sheath flow channel 20 at the downstream side of the bend 20A in the flow direction (namely, in front of the flow merging section 16A), bends around at an acute angle, and is formed such that a corner of the bent portion is a rounded curve.

The second sheath flow channel 22 is a path having a shape that is a substantially U-shape disposed widthwise along the length direction of the flow cell 10 in plan view, with the open side of the substantially U-shaped profile pointing in a width direction (i.e. the direction W) of the flow cell 10, so as to face the open side of the substantially U-shaped profile of the first sheath flow channel 20. The second sheath flow channel 22 is formed at a location on the other width direction (i.e. the direction W) side of the flow cell 10. In the first embodiment, the second sheath flow channel 22 has a substantially rectangular profile in a cross-section taken along a direction orthogonal to the length direction of the second sheath flow channel 22. The first sheath flow channel 20 and the second sheath flow channel 22 are arranged so as to have substantially the same height in the height direction of the flow cell 10 (i.e. the direction H). The second sheath flow channel 22 and the first sheath flow channel 20 are formed so as to be symmetrical in the width direction of the flow cell 10 (i.e. the direction W) in plan view.

The second sheath flow channel 22 is configured such that the sheath fluid 4 (see FIG. 6) flows in an arrow D direction. The upstream end of the second sheath flow channel 22 in the flow direction (i.e. the arrow D direction) is connected to the sheath intake port 24. Namely, the sheath intake port 24 is common to the second sheath flow channel 22 and the first sheath flow channel 20, and configuration is such that the sheath fluid 4 (see FIG. 6) introduced through the sheath intake port 24 branches to the second sheath flow channel 22 and to the first sheath flow channel 20. The second sheath flow channel 22 and the first sheath flow channel 20 have the same length and cross-sectional area as each other. A supply tube (not illustrated in the drawings) to supply the sheath fluid 4 (see FIG. 6) is connected to the sheath intake port 24. The second sheath flow channel 22 is configured such that the sheath fluid 4 supplied through the sheath intake port 24 flows in a direction toward the upstream side of the flow channel 16. Two bends 22A, 22B are formed partway along the flow direction of the second sheath flow channel 22. The bend 22A in the second sheath flow channel 22 upstream in the flow direction bends around at substantially a right angle, and is formed such that a corner of the bent portion is a rounded curve. The bend 22B in the second sheath flow channel 22 downstream of the bend 22A in the flow direction (namely, in front of the flow merging section 16A) bends around at an acute angle, and is formed such that a corner of the bent portion is a rounded curve.

The flow merging section 16A (see FIG. 4) is provided at the upstream end of the flow channel 16 in the flow direction (i.e. the arrow A direction). The sample fluid 2 (see FIG. 6) introduced through the sample flow channel 18 merges with the sheath fluid 4 (see FIG. 6) introduced through the first sheath flow channel 20 and the sheath fluid 4 introduced through the second sheath flow channel 22 by merging at the flow merging section 16A. Namely, the flow merging section 16A is part of the flow channel 16.

Figure 5:
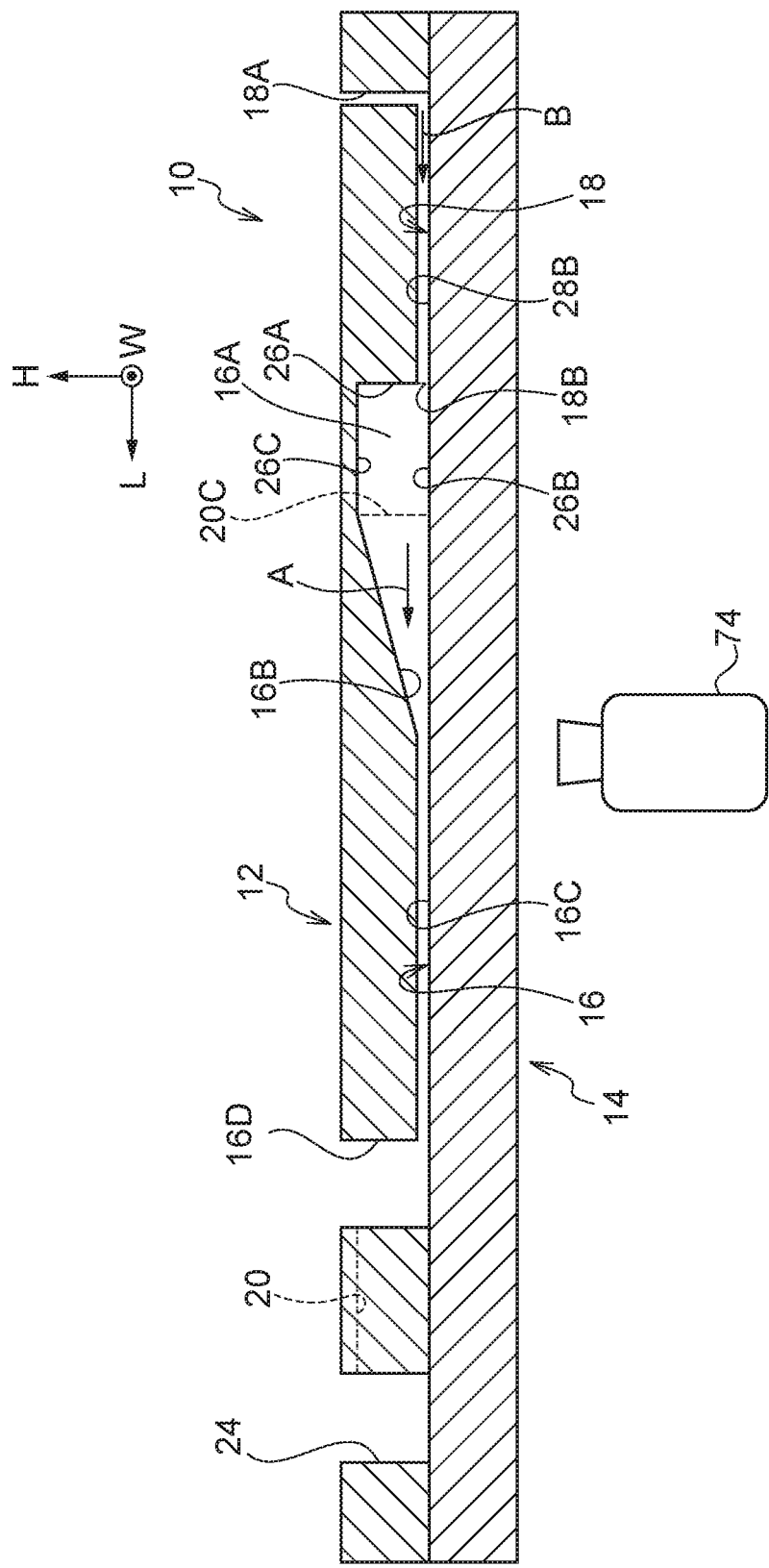
FIG. 5 is a cross-section illustrating a flow cell according to the first embodiment.
Figure 6:
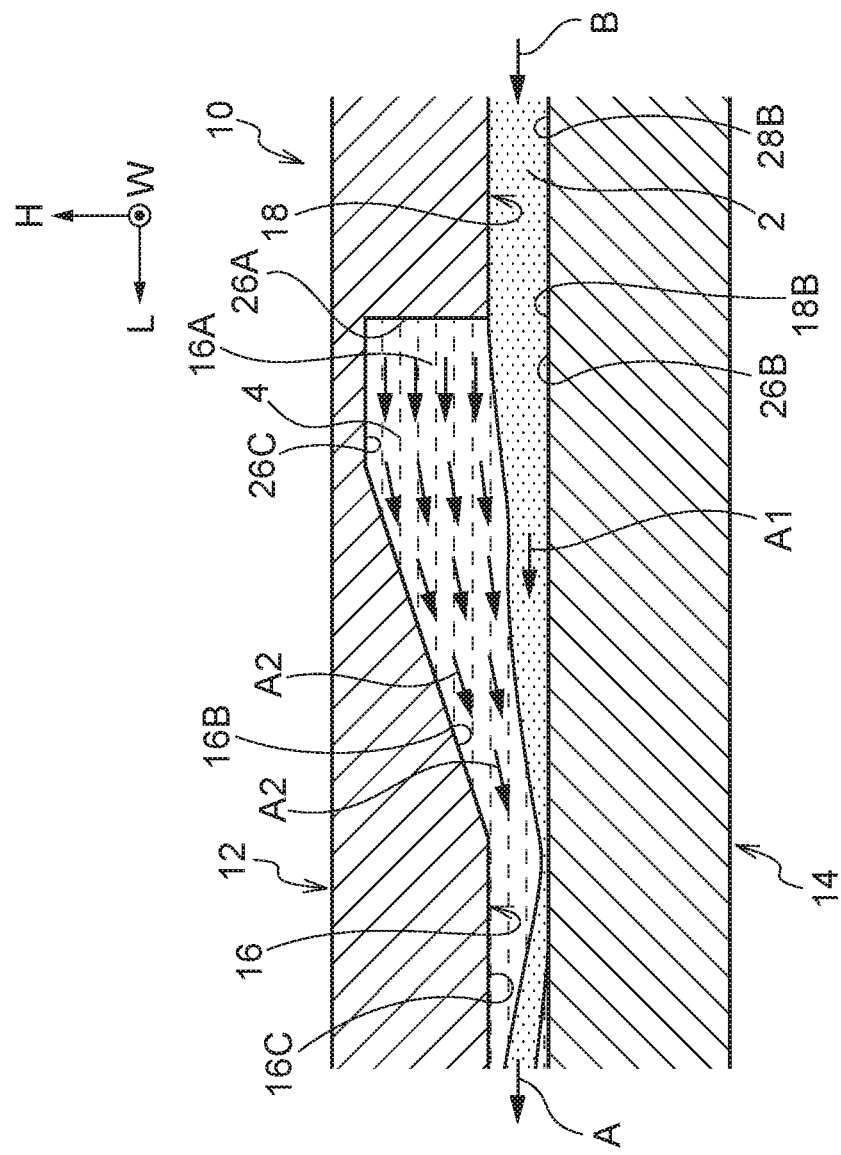
FIG. 6 schematically illustrates flow directions of a sample fluid and a sheath fluid in a flow channel of a flow cell according to the first embodiment, in a cross-section taken along the length direction of a flow channel.

As illustrated in FIG. 5 and FIG. 6, a sample introduction port 18B (see FIG. 1 to FIG. 3) is provided at a downstream end of the sample flow channel 18 in the flow direction (i.e. the arrow B direction). The sample introduction port 18B opens onto an end face 26A at the upstream of the flow channel 16 in the flow direction (i.e. the arrow A direction). The sample introduction port 18B is formed in one depth direction side of the end face 26A of the flow channel 16 (in the first embodiment, at a lower portion in the opposite direction to the direction H). More specifically, the flow channel 16 includes a lower wall 26B and an upper wall 26C, serving as a pair of wall faces that face in the depth direction. The sample flow channel 18 is provided in line with the lower wall 26B, serving as one wall face at one side (in the first embodiment, at a lower portion in the opposite direction to the direction H) facing across the flow merging section 16A of the flow channel 16. Namely, a lower wall 28B on the one depth direction side of the sample flow channel 18 (in the first embodiment, at a lower portion in the opposite direction to the direction H) is joined to the lower wall 26B of the flow channel 16 so as to lie in substantially the same plane thereas. The sample fluid 2 (see FIG. 6) of the sample flow channel 18 is introduced into the flow merging section 16A through the sample introduction port 18B. In other words, the sample flow channel 18 introduces the sample fluid 2 (see FIG. 6) into the flow merging section 16A along the lower wall 26B at the one side facing across the flow merging section 16A.

A first introduction port 20C (see FIG. 1 to FIG. 3) is provided at a downstream end in the flow direction of the first sheath flow channel 20 (i.e. the arrow C direction), and opens onto one side portion at the upstream side of the flow channel 16 in the flow direction (i.e. the arrow A direction). In plan view, the first introduction port 20C of the first sheath flow channel 20 is formed in a position intersecting with the end face 26A of the flow channel 16. In the first embodiment, a downstream portion of the first sheath flow channel 20 is connected to the flow merging section 16A so as to configure an obtuse angle with respect to the length direction of the flow channel 16. Moreover, the first sheath flow channel 20 is provided in line with the upper wall 26C, serving as another wall face on the other depth direction side (in the first embodiment, at an upper portion in the direction H), from out of the lower wall 26B and the upper wall 26C of the flow channel 16, serving as a pair of wall faces that face in the depth direction. In the first embodiment, in a cross-section view of the flow channel 16, the first introduction port 20C of the first sheath flow channel 20 is provided in a range in the depth direction of the flow channel 16 from the lower wall 26B to the upper wall 26C of the flow merging section 16A, and a lower portion of the first introduction port 20C overlaps with a range in the depth direction of the flow channel 16 where the sample introduction port 18B is provided (see FIG. 5). The sheath fluid 4 (see FIG. 6) of the first sheath flow channel 20 is configured so as to be introduced into the flow merging section 16A of the flow channel 16 through the first introduction port 20C. In other words, the first sheath flow channel 20 introduces the sheath fluid 4 into the flow merging section 16A in a direction of flow such that the sheath fluid 4 (see FIG. 6) presses the sample fluid 2 (see FIG. 6) toward the lower wall 26B.

A second introduction port 22C (see FIG. 1 to FIG. 3) is provided at a downstream end in the flow direction of the second sheath flow channel 22 (i.e. the arrow D direction), and opens onto another side portion at the upstream side of the flow channel 16 in the flow direction (i.e. the arrow A direction). In plan view, the second introduction port 22C of the second sheath flow channel 22 is formed in a position intersecting with the end face 26A of the flow channel 16. In the first embodiment, a downstream portion of the second sheath flow channel 22 is connected to the flow merging section 16A so as to configure an obtuse angle with respect to the length direction of the flow channel 16. Moreover, the second sheath flow channel 22 is provided in line with the upper wall 26C, serving as the other wall face on the other depth direction side of the flow channel 16 (in the first embodiment, at an upper portion in the direction H). In the first embodiment, in a cross-section view of the flow channel 16, the second introduction port 22C of the second sheath flow channel 22 is provided in a range in the depth direction of the flow channel 16 from the lower wall 26B to the upper wall 26C of the flow merging section 16A, and a lower portion of the second introduction port 22C overlaps with a range in the depth direction of the flow channel 16 where the sample introduction port 18B is provided. The sheath fluid 4 (see FIG. 6) of the second sheath flow channel 22 is configured so as to be introduced into the flow merging section 16A of the flow channel 16 through the second introduction port 22C. In other words, the second sheath flow channel 22 introduces the sheath fluid 4 into the flow merging section 16A in a direction of flow such that the sheath fluid 4 (see FIG. 6) presses the sample fluid 2 (see FIG. 6) toward the lower wall 26B. Moreover, the first introduction port 20C and the second introduction port 22C are provided at positions that overlap with each other in the depth direction of the flow merging section 16A of the flow channel 16.

In the flow cell 10 of the first embodiment, the length direction of the sample flow channel 18 is arranged so as to lie on an extension line of the length direction of the flow channel 16. In the first embodiment, the flow channel 16 has a substantially rectangular profile in a cross-section taken along a direction orthogonal to the length direction of the flow channel 16. The width and the depth of the flow channel 16 are greater than the width and the depth of the sample flow channel 18. The sample flow channel 18 is connected to a width direction central portion of the flow merging section 16A of the flow channel 16, and is connected to a depth direction lower portion of the flow merging section 16A of the flow channel 16 (see FIG. 5). Moreover, in the first embodiment, so as not to waste the sample fluid 2, first, the sheath fluid 4 (see FIG. 6) is introduced into the flow merging section 16A of the flow channel 16 through the first sheath flow channel 20 and the second sheath flow channel 22. Then, the sample fluid 2 (see FIG. 6) from the sample flow channel 18 is introduced into the flow merging section 16A in a state in which the sheath fluid 4 is being introduced into the flow merging section 16A of the flow channel 16.

Downstream of the flow merging section 16A of the flow channel 16 in the flow direction (i.e. the arrow A direction), a tapered section 16B (see FIG. 4 to FIG. 6) that gradually becomes shallower in depth on progression downstream is provided to the upper wall 26C of the flow channel 16. The tapered section 16B is formed only on the upper wall 26C of the flow channel 16. In the first embodiment, the tapered section 16B is formed in a shape in which the spacing of the upper wall 26C to the lower wall 26B gradually becomes narrower. In the first embodiment, the tapered section 16B is provided at a position adjoining the flow merging section 16A of the flow channel 16. The tapered section 16B has an inclination angle of, for example, from 2° to 8° to the plane direction of the flow cell 10 (in the first embodiment, the plane direction of the lower wall 26B).

A flattened section 16C having a depth shallower than that of the flow merging section 16A is formed downstream of the tapered section 16B of the flow channel 16 in the flow direction (i.e. the arrow A direction). The tapered section 16B is configured so as to link the upper wall 26C of the flow merging section 16A and the flattened section 16C together.

The flow cell 10 is configured such that the sample fluid 2 (see FIG. 6) flows along the lower wall 26B due to the lower wall 26B of the flow channel 16 being contiguous to the lower wall 28B of the sample flow channel 18 and disposed in the same plane thereas. Moreover, the sheath fluid 4 (see FIG. 6) that merges at the flow merging section 16A from the second sheath flow channel 22 and the first sheath flow channel 20 is configured to press the sample fluid 2 (see FIG. 6) toward the lower wall 26B.

A camera 74, serving as an imaging mechanism to image the sample fluid 2 (see FIG. 6), is disposed outside the flow cell 10 at a position facing the flattened section 16C (see FIG. 5). Moreover, the camera 74 is disposed at a position where the sample fluid 2 flows in contact with the lower wall 26B. The cross-sectional areas of the second sheath flow channel 22 and the first sheath flow channel 20 are each greater than the cross-sectional area of the sample flow channel 18.

As illustrated in FIG. 1 to FIG. 3, a discharge port 16D for discharging fluid (namely, the sample fluid 2 and the sheath fluid 4) is formed at a downstream end of the flow channel 16 in the flow direction (i.e. the arrow A direction). A non-illustrated discharge tube is connected to the discharge port 16D, such that fluid (namely, the sample fluid 2 and the sheath fluid 4) is discharged through the discharge port 16D into the discharge tube.

The flow cell 10 of the first embodiment is configured such that rates of flow of the sample fluid 2 (see FIG. 6) and the sheath fluid 4 (see FIG. 6) in the first sheath flow channel 20 and the second sheath flow channel 22 are controlled. A ratio of flow rates between the sample fluid 2 (see FIG. 6) and the sheath fluid 4 (see FIG. 6) is set so as to be from 1:20 to 1:40. The width and the thickness of the sample fluid 2 (see FIG. 6) flowing in the flow channel 16 is controlled by controlling the ratio of flow rates between the sample fluid 2 (see FIG. 6) and the sheath fluid 4 (see FIG. 6). In the flow rate control, for example, the flow rate of the sheath fluid 4 (see FIG. 6) is controlled to 3% or less, and the flow rate of the sample fluid 2 (see FIG. 6) is controlled to 50% or less.

The flow cell 10 is substantially transparent, and is, for example, formed from a resin. The material for the flow cell 10 may be selected from materials having a transparency to visible light of 90% or greater, such as, for example, polymethyl methacrylate (PMMA), a cyclo olefin polymer (COP), polydimethylsiloxane (PDMS), polypropylene (PP), or glass. The flow channel 16, the sample flow channel 18, the first sheath flow channel 20, and the second sheath flow channel 22 are formed in the first plate shaped body 12 by laser processing or the like. The flow cell 10 is formed by sticking the first plate shaped body 12 and the second plate shaped body 14 together. In the first embodiment, as an example, the first plate shaped body 12 and the second plate shaped body 14 are stuck together by thermocompression bonding. The flow cell 10 is small and is easy to fabricate. This means that the required amount of sample and the required amount of sheath fluid are small. Moreover, a quick response can be made to replace the flow cell 10 with a new one in cases in which faults occur in the flow cell 10.

Operation and Advantageous Effects

Next, explanation follows regarding the operation and advantageous effects of the first embodiment.

As illustrated in FIG. 1 and FIG. 2, in the flow cell 10, the supply tube (not illustrated in the drawings) for supplying the sample fluid 2 (see FIG. 6) is connected to the intake port 18A of the sample flow channel 18, and the sample fluid 2 is supplied through the intake port 18A into the sample flow channel 18. The sample fluid 2 supplied through the intake port 18A flows through the sample flow channel 18 in the arrow B direction toward the flow merging section 16A of the flow channel 16. Moreover, in the flow cell 10, the supply tube (not illustrated in the drawings) for supplying the sheath fluid 4 (see FIG. 6) is connected to the sheath intake port 24, and the sheath fluid 4 is supplied through the sheath intake port 24 and into each of the first sheath flow channel 20 and the second sheath flow channel 22 that branch from the sheath intake port 24. In the first sheath flow channel 20, the sheath fluid 4 flows in the arrow C direction toward the flow merging section 16A of the flow channel 16. In the second sheath flow channel 22, the sheath fluid 4 flows in the arrow D direction toward the flow merging section 16A of the flow channel 16.

The two bends 20A, 20B are formed in the first sheath flow channel 20, with the upstream bend 20A bent around at substantially a right angle, and the downstream bend 20B bent around at an acute angle. There is a great pressure loss due to the sheath fluid 4 flowing through the bends 20A, 20B. Similarly, the two bends 22A, 22B are formed in the second sheath flow channel 22, with the upstream bend 22A bent around at substantially a right angle, and the downstream bend 22B bent around at an acute angle. There is a great pressure loss due to the sheath fluid 4 flowing through the bends 22A, 22B.

As illustrated in FIG. 4 to FIG. 6, the sample fluid 2 (see FIG. 6) of the sample flow channel 18, the sheath fluid 4 (see FIG. 6) of the first sheath flow channel 20, and the sheath fluid 4 (see FIG. 6) of the second sheath flow channel 22 merge at the flow merging section 16A of the flow channel 16. The sample fluid 2 (see FIG. 6) of the sample flow channel 18 flows in the arrow B direction, and is introduced into the flow merging section 16A of the flow channel 16 through the sample introduction port 18B. The sheath fluid 4 (see FIG. 6) of the first sheath flow channel 20 flows in the arrow C direction, and is introduced into the flow merging section 16A of the flow channel 16 through the first introduction port 20C from one direction that intersects with the length directions of the flow channel 16 and the sample flow channel 18 (see FIG. 1 and FIG. 2). The sheath fluid 4 (see FIG. 6) of the second sheath flow channel 22 flows in the arrow D direction, and is introduced into the flow merging section 16A of the flow channel 16 through the second introduction port 22C from another direction that intersects with the length directions of the flow channel 16 and the sample flow channel 18 (see FIG. 1 and FIG. 2).

In the first embodiment, the sample flow channel 18 is provided in line with the lower wall 26B (see FIG. 5 and FIG. 6) at the one depth direction side of the flow merging section 16A (in the first embodiment, at a lower portion in the opposite direction to the direction H). The first sheath flow channel 20 is provided in line with the upper wall 26C at the other depth direction side of the flow merging section 16A (in the first embodiment, at an upper portion in the direction H). The second sheath flow channel 22 is provided in line with the upper wall 26C at the other depth direction side of the flow merging section 16A (in the first embodiment, at an upper portion in the direction H).

As illustrated in FIG. 6, at the flow merging section 16A of the flow channel 16, mixing of the sample fluid 2 and the sheath fluid 4 is suppressed when the sample fluid 2 and the sheath fluid 4 merge, due to the sheath fluid 4 flowing in as a laminar flow from the first sheath flow channel 20 and the second sheath flow channel 22 (see FIG. 4 etc.) merging above the sample fluid 2 that is also flowing in a laminar flow.

Figure 7:
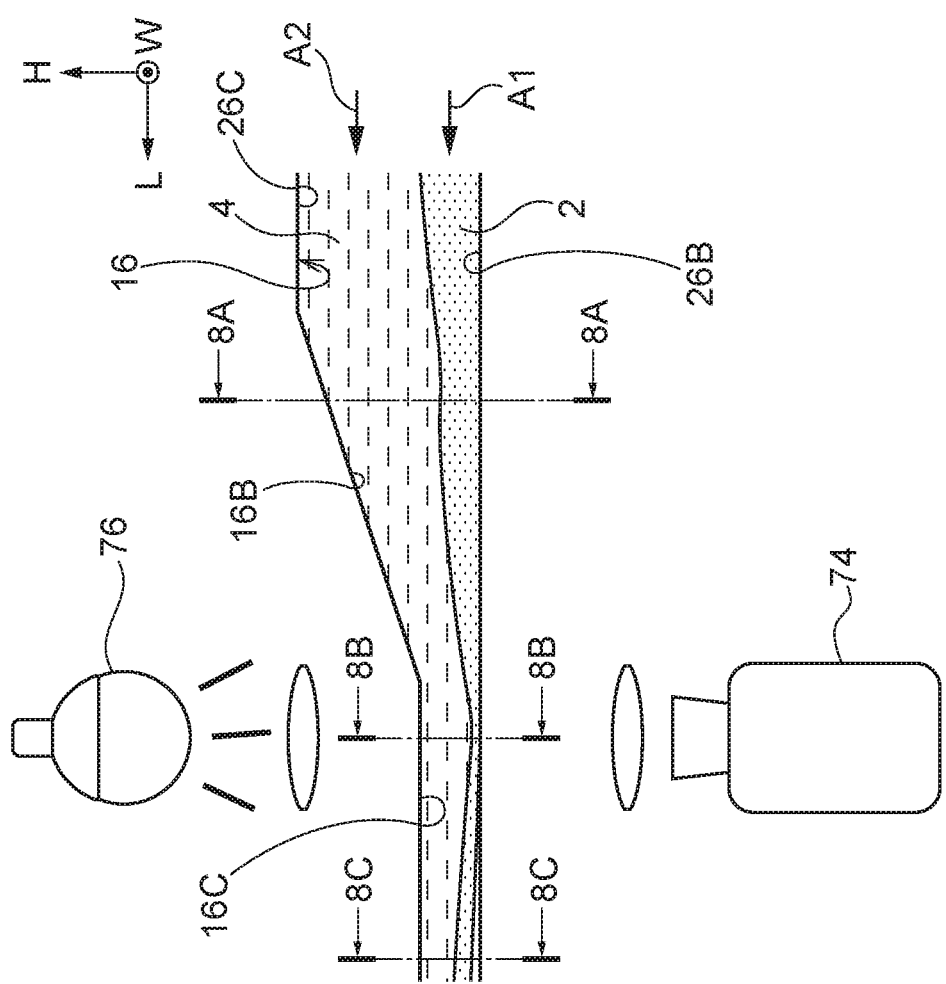
FIG. 7 illustrates flows of a sample fluid and a sheath fluid in a flow channel of a flow cell and an imaging position according to the first embodiment, in a cross-section taken along the length direction of a flow channel.
Figure 8A:
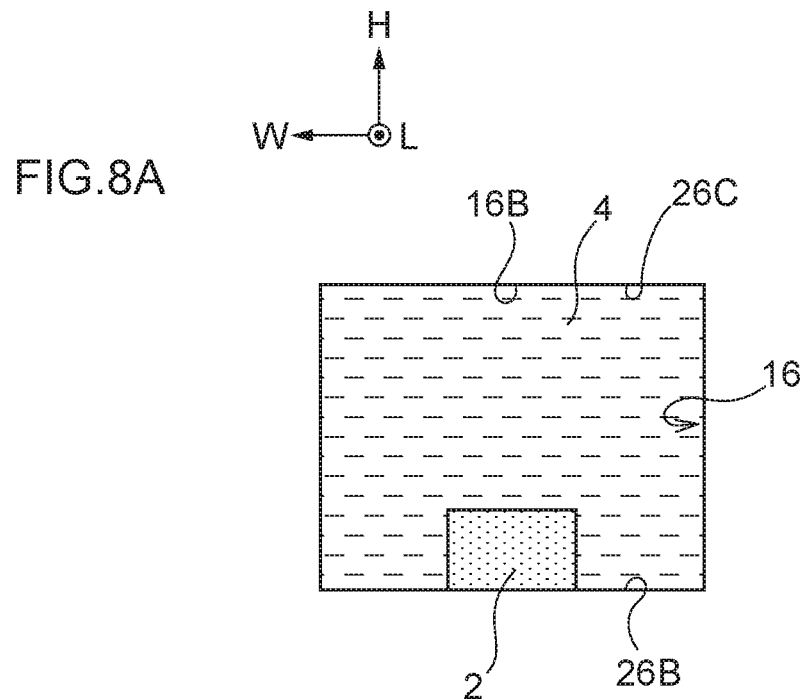
FIG. 8A is a cross-section of a flow channel taken along line 8A-8A in FIG. 7.
Figure 8B:
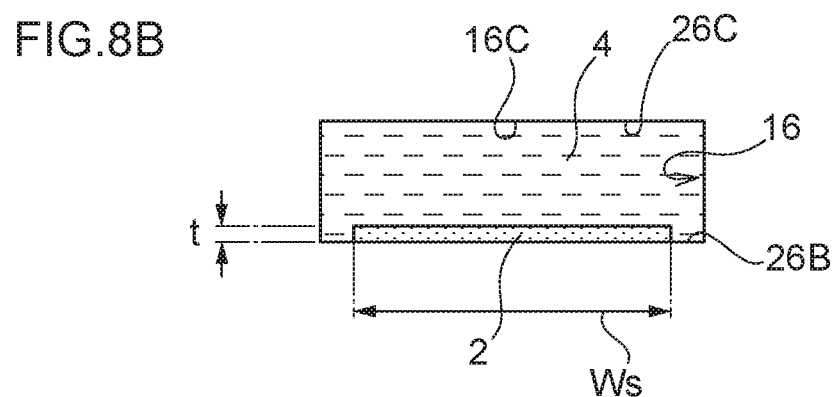
FIG. 8B is a cross-section of a flow channel taken along line 8B-8B in FIG. 7.

Moreover, due to the sample flow channel 18 being provided in line with the lower wall 26B of the flow merging section 16A, the sample fluid 2 introduced from the sample flow channel 18 flows along the lower wall 26B of the flow channel 16 in the arrow A1 direction. Moreover, the tapered section 16B is provided to the upper wall 26C of the flow channel 16 so as to gradually become shallower in depth on progression downstream. Thus, as illustrated in FIG. 6 and FIG. 7, in the flow channel 16, the sheath fluid 4 introduced into the flow merging section 16A from the first sheath flow channel 20 and the second sheath flow channel 22 flows in the arrow A2 direction due to the tapered section 16B, so as to press the sample fluid 2 against the lower wall 26B of the flow channel 16. Thus, as illustrated in FIG. 6, FIG. 7, FIG. 8A, and FIG. 8B, in the tapered section 16B of the flow channel 16, due to the sheath fluid 4 (see FIG. 6) pressing against the sample fluid 2 from above, the sample fluid 2 is spread out in a flattened shape along the lower wall 26B, such that the thickness of the sample fluid 2 gradually thins and the width gradually increases. The sample fluid 2 is flowing in contact with the lower wall 26B when this occurs. Thus, as illustrated in FIG. 7 and FIG. 8B, at an upstream portion of the flattened section 16C of the flow channel 16, the sample fluid 2 flows along the lower wall 26B, in a state in which a thickness t of the sample fluid 2 becomes thinner and a width Ws of the sample fluid 2 increases. The thickness t of the sample fluid 2 is, as an example, from approximately 5 μm to approximately 30 μm. In FIG. 7, the camera 74 for imaging the sample fluid 2 is disposed at a position facing the lower wall 26B, and a light source 76 is disposed at a position facing the camera 74 on the other side of the flow cell 10 (for example, the flow channel 16). Note that when the sample fluid 2 is being spread out in a flattened shape, it is preferably for the sample fluid 2 not to contact the side walls of the flattened section 16C such that there is little contamination inside the flow cell 10.

Figure 8C:
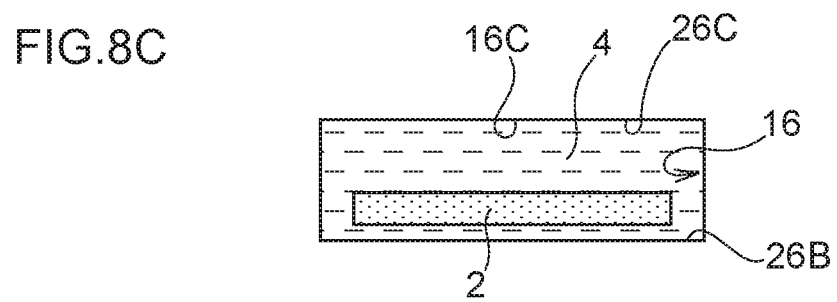
FIG. 8C is a cross-section of a flow channel taken along line 8C-8C in FIG. 7.

Then, as illustrated in FIG. 8C, the sample fluid 2 is lifted by a tubular pinch effect at a portion downstream of the flattened section 16C of the flow channel 16, such that the sample fluid 2 flows coalesced around a position approximately 20 μm away from the lower wall 26B. The sheath fluid 4 flows between the lower wall 26B and the sample fluid 2. The tubular pinch effect has a greater variation for samples with smaller particle diameters.

Thus, by imaging the sample fluid 2 with the camera 74 (see FIG. 5) at an upstream portion of the flattened section 16C of the flow channel 16 (in the first embodiment, for example, within a range of approximately 2 mm from the start position of the flattened section 16C), the sample fluid 2 can be collected together in a range lying within the depth of imaging field. Moreover, due to the sheath fluid 4 not being interposed between the camera 74 and the sample fluid 2, there is no influence from diffuse reflection by the sheath fluid 4, enabling clear images to be acquired.

Moreover, the sample fluid 2 and the sheath fluid 4 downstream of the flattened section 16C of the flow channel 16 are discharged through the discharge port 16D into the discharge tube (not illustrated in the drawings).

In the flow cell 10 described above, the flow channel 16 includes the flow merging section 16A where the sample flow channel 18 merges with the first sheath flow channel 20 and the second sheath flow channel 22. Furthermore, the flow channel 16 includes the flattened section 16C that is formed in line with the lower wall 26B downstream of the flow merging section 16A and that has a depth shallower than that of the flow merging section 16A, and the tapered section 16B that connects the flow merging section 16A and the flattened section 16C together and that has a depth that gradually becomes shallower on progression downstream. The sample flow channel 18 introduces the sample fluid 2 into the flow merging section 16A along the lower wall 26B at one side of the flow merging section 16A, and the first sheath flow channel 20 and the second sheath flow channel 22 introduce the sheath fluid 4 into the flow merging section 16A with directions of flow such that the sheath fluid 4 presses the sample fluid 2 against the lower wall 26B. This suppresses the sample fluid 2 from mixing with the sheath fluid 4 at the flow merging section 16A. Moreover, the sample fluid 2 is pressed from above by the sheath fluid 4 due to the tapered section 16B, and the sample fluid 2 is spread out along the lower wall 26B in a flattened shape such that the thickness is thin. This enables clear images to be acquired of the sample, while suppressing the sample fluid 2 from mixing with the sheath fluid 4.

Moreover, in the flow cell 10 described above, the sample flow channel 18 is provided in line with the lower wall 26B at the one side facing across the flow merging section 16A, and the first sheath flow channel 20 and the second sheath flow channel 22 are provided in line with the upper wall 26C at the other side facing across the flow merging section 16A. Thus, in the flow channel 16, the sample fluid 2 flows along the lower wall 26B, facilitating flow such that the sheath fluid 4 presses the sample fluid 2 against the lower wall 26B.

Moreover, in the flow cell 10 described above, the ratio of flow rates between the sample fluid 2 and the sheath fluid 4 is from 1:20 to 1:40. This enables the width and the thickness of the sample fluid 2 in the flow channel 16 to be more effectively controlled.

Moreover, in the flow cell 10 described above, the first sheath flow channel 20 and the second sheath flow channel 22 are provided to introduce the sheath fluid 4 into the flow channel 16. Thus, at the flow merging section 16A of the flow channel 16, the width and the thickness of the sample fluid 2 can be more effectively controlled, while suppressing mixing of the sample fluid 2 with the sheath fluid 4 from the first sheath flow channel 20 and the second sheath flow channel 22.

Moreover, in the flow cell 10 described above, the sheath intake port 24 is common to the first sheath flow channel 20 and the second sheath flow channel 22, the bends 20A, 20B are formed partway along the first sheath flow channel 20, and the bends 22A, 22B are formed partway along the second sheath flow channel 22. The bend 20B and the bend 22B in front of the flow merging section 16A bend around at acute angles, with the downstream sides of the bend 20B and the bend 22B arranged along directions intersecting with the flow channel direction of the sample fluid 2. Due to a great pressure loss in the sheath fluid 4 caused by the bends 20A, 20B of the first sheath flow channel 20 and the bends 22A, 22B of the second sheath flow channel 22, a pressure difference between the sample fluid 2 and the sheath fluid 4 is created at the flow merging section 16A of the flow channel 16. Hence, mixing between the sample fluid 2 and the sheath fluid 4 can be suppressed with greater certainty, facilitating flow of the sample fluid 2 and the sheath fluid 4 in a laminar flow state.

Measurement Device Configuration

Figure 9:
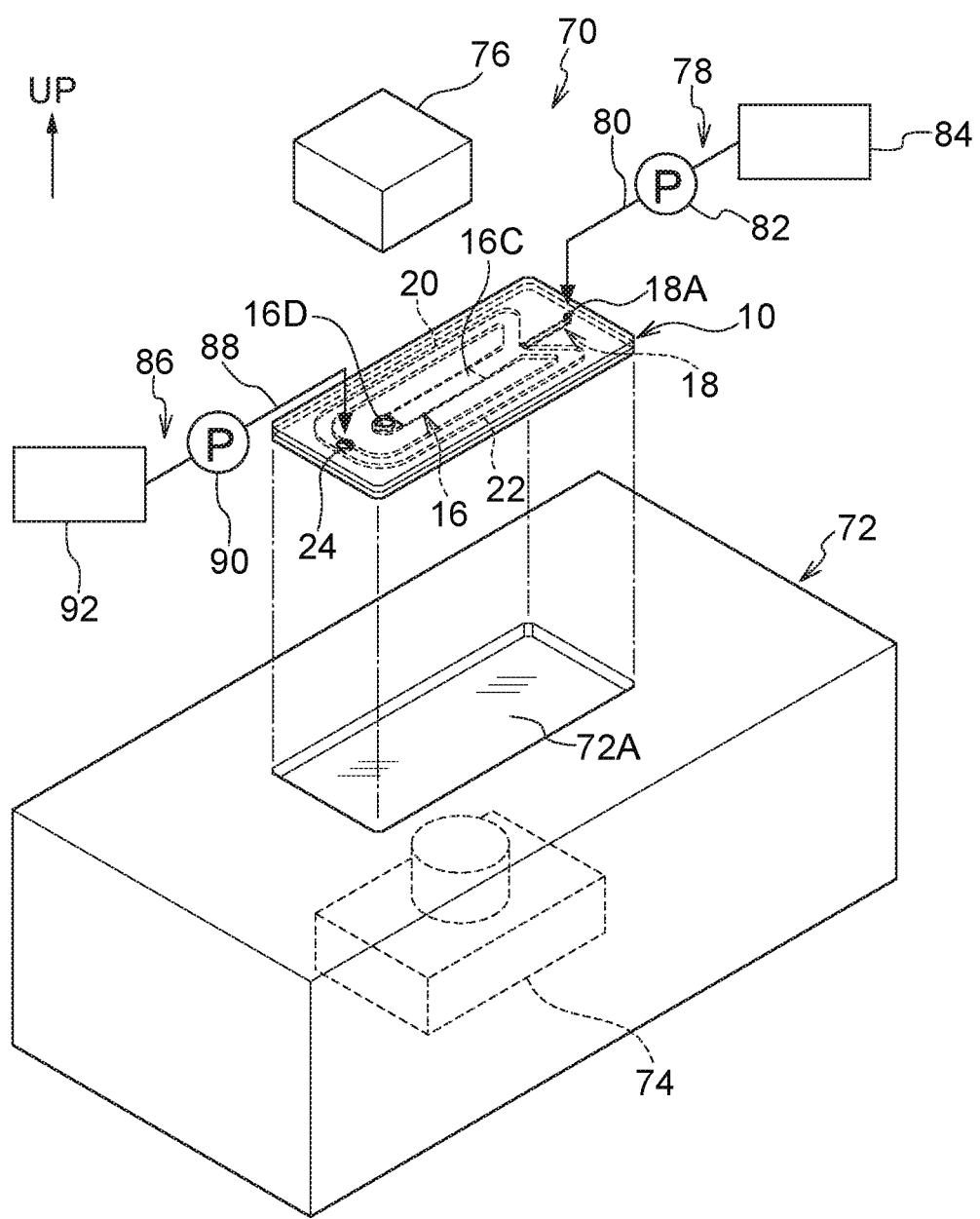
FIG. 9 is a perspective view illustrating an example of a measurement device to image a sample fluid supplied to a flow cell according to the first embodiment.
Figure 10:
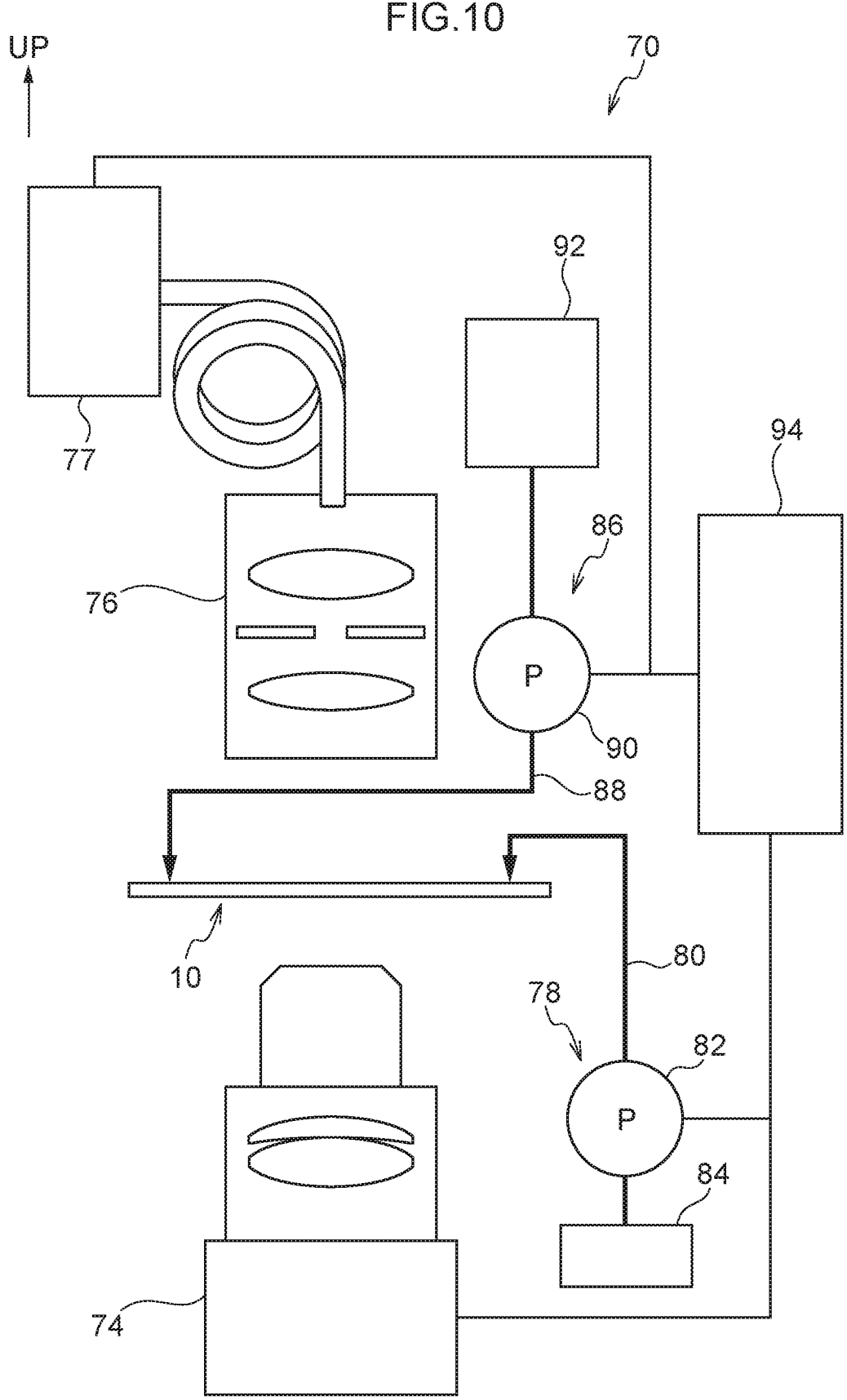
FIG. 10 is a schematic diagram illustrating an example of a measurement device to image a sample fluid supplied into a flow cell according to the first embodiment, as viewed from the side.
Figure 11:
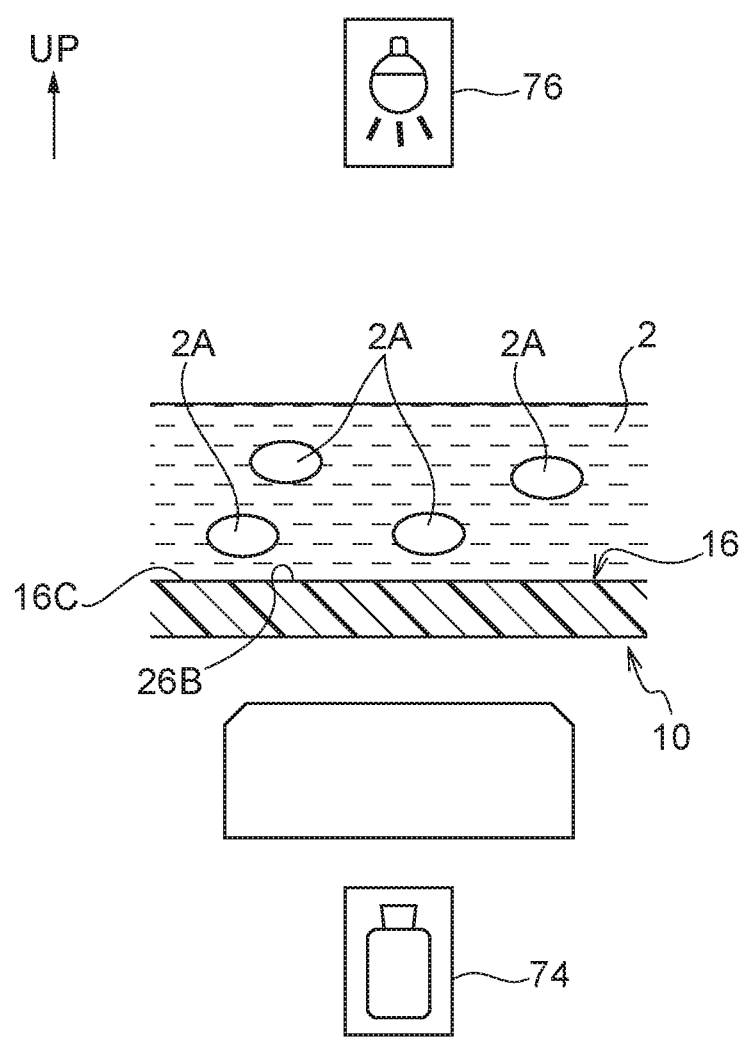
FIG. 11 is a cross-section schematically illustrating a state of a sample fluid and a sheath fluid in a flow cell according to the first embodiment, in an imaging section of a measurement device.

FIG. 9 is a perspective view illustrating a measurement device 70, and FIG. 10 is a schematic diagram illustrating the measurement device 70, as viewed from the side. The measurement device 70 employs the flow cell 10 of the first embodiment, and images the sample fluid 2 (see FIG. 6).

As illustrated in FIG. 9 and FIG. 10, the measurement device 70 includes a case 72 (see FIG. 9) in which the flow cell 10 is disposed. The case 72 includes a recess 72A for inserting the flow cell 10 into, and positions surrounding the recess 72A on the case 72 are formed from a transparent material (for example, glass). The camera 74 is provided as an imaging mechanism at a position inside the case 72 facing toward the flow cell 10. The light source 76 is provided above the case 72, at a position facing the camera 74 on the other side of the flow cell 10. The camera 74 is disposed at a position facing the flattened section 16C of the flow channel 16 in the flow cell 10.

The measurement device 70 includes a first supply device 78, serving as a sample supply mechanism, to supply the sample fluid 2 (see FIG. 6) to the intake port 18A of the sample flow channel 18 in the flow cell 10. The first supply device 78 includes a supply tube 80 having one end connected to the intake port 18A, a pump 82 provided partway along the supply tube 80, and a sample storage section 84 that is connected to the other end of the supply tube 80 and stores the sample fluid 2.

The measurement device 70 includes a second supply device 86, serving as a sheath supply mechanism to supply the sheath fluid 4 (see FIG. 6) to the sheath intake port 24 of the first sheath flow channel 20 and the second sheath flow channel 22 in the flow cell 10. The second supply device 86 includes a supply tube 88 having one end connected to the sheath intake port 24, a pump 90 provided partway along the supply tube 88, and a tank 92 that is connected to the other end of the supply tube 88 and stores the sheath fluid 4. A light source actuator 77 to cause exposure by the light source 76 is electrically connected to the light source 76 (see FIG. 10). Moreover, the measurement device 70 includes a controller 94 for controlling the respective operations of the camera 74, the light source actuator 77, the pump 82, and the pump 90 (see FIG. 10). The controller 94 uses a pulse signal to cause the light source 76 to emit light at a predetermined interval, and controls the flow rates of the sample fluid 2 and the sheath fluid 4 by driving the pump 82 and the pump 90. Moreover, one end of a non-illustrated discharge tube is connected to the discharge port 16D of the flow channel 16 in the flow cell 10, and the other end of the discharge tube is connected to a waste tank (not illustrated in the drawings).

Operation and Advantageous Effects of the Measurement Device

In the measurement device 70, driving the pump 90 supplies the sheath fluid 4 (see FIG. 6) from the tank 92 to the first sheath flow channel 20 and the second sheath flow channel 22 through the sheath intake port 24 of the flow cell 10. First the sheath fluid 4 is supplied to the flow cell 10, and then, after introducing the sheath fluid 4 into the flow merging section 16A of the flow channel 16, supply of the sample fluid 2 is started. Driving the pump 82 supplies the sample fluid 2 (see FIG. 6) from the sample storage section 84 to the sample flow channel 18 through the intake port 18A of the flow cell 10.

In the flow cell 10, because of how the sample fluid 2 and the sheath fluid 4 flow through the tapered section 16B after the sample fluid 2 and the sheath fluid 4 have merged at the flow merging section 16A of the flow channel 16, as described above, the sheath fluid 4 (see FIG. 6) flows so as to press the sample fluid 2 (see FIG. 6) against the lower wall 26B (see FIG. 6). Thus, the sample fluid 2 is spread out along the lower wall 26B in a flattened shape such that the thickness is thin.

The camera 74 is disposed at a position in the measurement device 70 facing the flattened section 16C of the flow cell 10, and the sample fluid 2 flowing in the flattened section 16C of the flow cell 10 is imaged by actuating the camera 74 and causing the light source 76 to emit light. The focal point of the camera 74 is adjusted so as to be aligned with the sample fluid 2 at the lower wall 26B side of the flattened section 16C (see FIG. 5).

In the measurement device 70 described above, the camera 74 is disposed so as to face the flow cell 10 where the sheath fluid 4 is pressing the sample fluid 2 against the lower wall 26B of the flow cell 10, and the camera 74 images the sample fluid 2 as it flows in the flattened section 16C that is shallower in depth than the flow merging section 16A. Due to the focal point of the camera 74 being adjusted so as to be aligned with the sample fluid 2 at the lower wall 26B side of the flattened section 16C, a situation in which some of the sample fluid 2 lies outside the depth of imaging field of the camera 74 can be suppressed from occurring. Namely, the sample fluid 2 can be collected together so as to lie inside the depth of imaging field when the sample fluid 2 is being imaged by the camera 74. This enables clear images to be acquired of the sample.

In the measurement device 70 described above, at the flattened section 16C where the camera 74 is imaging, the sample fluid 2 flows in contact with the lower wall 26B of the flattened section 16C. When doing so, the camera 74 is imaging at a position where the sample fluid 2 is spread out along the lower wall 26B in a flattened shape. This enables the sample fluid 2 to be imaged before the sample fluid 2 is separated from the lower wall 26B by the tubular pinch effect, thereby enabling more certain acquisition of clear images of the sample.

In the measurement device 70 described above, as illustrated in FIG. 11, at the flattened section 16C where the camera 74 is imaging, the sheath fluid 4 is not interposed between the lower wall 26B of the flattened section 16C and the sample fluid 2. This reduces the occurrence of image distortion or the like due to fluctuations in the sheath fluid 4, enabling clearer images of sample bodies 2A to be acquired.

Figure 12:
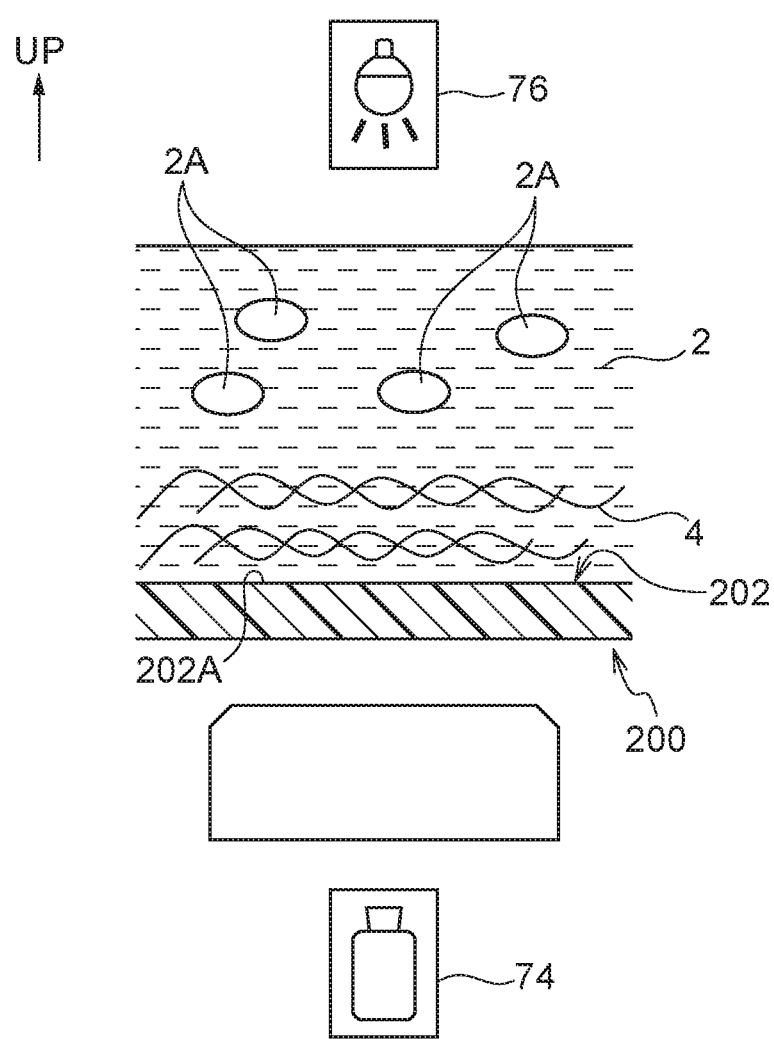
FIG. 12 is a cross-section schematically illustrating a state of a sample fluid and a sheath fluid in a flow cell according to a comparative example, in an imaging section of a measurement device.

In contrast thereto, as illustrated in FIG. 12, in a flow cell 200 of a comparative example, a configuration is adopted in which a sample fluid 2 flows as a laminar flow in a flow channel 202 so as to be sandwiched from above and below by a sheath fluid 4 (the sheath fluid 4 above the sample fluid 2 is omitted from illustration in FIG. 12). In the flow cell 200, due to the sheath fluid 4 flowing between the sample fluid 2 and a lower wall 202A of the flow channel 202 of the flow cell 200, image distortion or the like (for example, noise and blurry images) are caused by fluctuations in the sheath fluid 4, such that acquired images are blurry. Moreover, in the comparative example, the sample fluid 2 is sandwiched by the sheath fluid 4. However, in the flow cell 10 of the first embodiment, the flow of the sample fluid 2 can be stabilized more than in the flow cell 200 of the comparative example due to the sample fluid 2 being pressed by the sheath fluid 4 against the lower wall 26B of the flow cell 10.

Supplementary Explanation

Note that although in the first embodiment the two bends 20A, 20B are provided in the first sheath flow channel 20, and the two bends 22A, 22B are provided in the second sheath flow channel 22, the present disclosure is not limited to such a configuration. For example, the number of bends in the sheath flow channels may be varied, and one bend may be provided, or three or more bends may be provided. Moreover, although in the first embodiment the sheath intake port 24 is common to the first sheath flow channel 20 and the second sheath flow channel 22, the present disclosure is not limited to such a configuration. For example, a separate intake port for the sheath fluid may be provided for each of a first sheath flow channel and a second sheath flow channel. Moreover, the first sheath flow channel 20 and the second sheath flow channel 22 may be asymmetrical in shape.

Moreover, although in the first embodiment the first sheath flow channel 20 and the second sheath flow channel 22 through which the sheath fluid flows are provided in the flow cell 10, the present disclosure is not limited to such a configuration. For example, a configuration may be adopted in which at least one sheath flow channel in which the sheath fluid flows is provided in the flow cell.

Moreover, although in the first embodiment a configuration is adopted in which, at the flow merging section 16A of the flow channel 16, the sample fluid 2 flows along the lower wall 26B and the sheath fluid 4 flows so as to press the sample fluid 2 against the lower wall 26B, the present disclosure is not limited to such a configuration. For example, a configuration may be adopted in which, at a merging section of a flow channel, a sample fluid flows along an upper wall and a sheath fluid flows so as to press the sample fluid against the upper wall, or a configuration may be adopted in which the sample fluid flows along one wall face in the left or right direction, and the sheath fluid flows so as to press the sample fluid against the one left or right wall face. Moreover, in such cases, the pressure of the sample fluid may be increased.

Moreover, although in the first embodiment a configuration is adopted in which the sample flow channel 18 is provided in line with the lower wall 26B from out of the lower wall 26B and the upper wall 26C facing across the flow channel 16, the present disclosure is not limited to such a configuration. A sample flow channel may be provided in line with one wall face out of a pair of wall faces facing along an up-down direction, left-right direction, or the like in the flow channel. For example, the sample flow channel may be provided in line with an upper wall of the flow channel, or one wall face facing in the left-right direction. Similarly, although the first sheath flow channel 20 and the second sheath flow channel 22 are provided in line with the upper wall 26C from out of the lower wall 26B and the upper wall 26C facing across the flow channel 16, the present disclosure is not limited to such a configuration. The sheath flow channel may be provided in line with the other wall face from out of the pair of wall faces facing in the up-down direction, the left-right direction, or the like of the flow channel. For example, the sheath flow channel may be provided in line with a lower wall of the flow channel, or in line with the other wall face facing in the left-right direction.

Moreover, although in the first embodiment, the first sheath flow channel 20 and the second sheath flow channel 22 are provided at positions so as to overlap with the entire sample flow channel 18 in the depth direction of the flow merging section 16A, the present disclosure is not limited to such a configuration. For example, a configuration may be adopted in which the sheath flow channel is provided at a position overlapping with part of the sample flow channel in the depth direction of a flow merging section, or a configuration may be adopted in which the sheath flow channel does not overlap with the sample flow channel in the depth direction of a flow merging section (as an example, a configuration in which the sheath flow channel and the sample flow channel are disposed at two levels in the up-down direction).

Moreover, in the first embodiment, the length of the flow cell in the length direction of the sample flow channel 18 and the flow channel 16, the width of the flow cell in a direction orthogonal to the length direction, and the like may be varied.

Note that although embodiments have been given to explain embodiments of the present disclosure, these are merely exemplary embodiments, and various modifications may be implemented within a range not departing from the spirit thereof. Moreover, the scope of rights of the present disclosure is not limited to these embodiments, and obviously various modifications may be implemented within a range not departing from the spirit of the present disclosure.

The entire disclosure of Japanese Patent Application 2017-125413 filed Jun. 27, 2017 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

The invention claimed is:

1. A flow cell comprising:
   a flow channel through which a sample fluid and a sheath fluid flow;
   a sample flow channel that introduces the sample fluid into the flow channel, the sample flow channel including a first wall and a second wall that face each other; and
   at least one sheath flow channel that introduces the sheath fluid into the flow channel;
   the flow channel comprising:
   a flow merging section where the sample flow channel and the sheath flow channel merge,
   a flattened section that is disposed downstream of the flow merging section, that is formed in line with one wall of walls facing across the flow merging section, the one wall being contiguously formed to the first wall, and the flattened section being shallower in depth than the flow merging section, and
   a tapered section that connects the flow merging section with the flattened section and that gradually decreases on progression downstream,
   wherein the sample flow channel has the first wall formed parallel to the one wall of the walls that face across the flow merging section and introduces the sample fluid into the flow merging section, and
   wherein the sheath flow channel introduces the sheath fluid into the flow merging section in a direction from the second wall to the first wall.

2. The flow cell of claim 1, wherein a ratio of flow rates between the sample fluid and the sheath fluid is from 1:20 to 1:40.

3. The flow cell of claim 1, wherein the sheath flow channel comprises a first sheath flow channel and a second sheath flow channel that introduce the sheath fluid into the flow channel.

4. The flow cell of claim 3, wherein:
   the first sheath flow channel and the second sheath flow channel share a common sheath intake port,
   at least one bend is formed partway along the first sheath flow channel and partway along the second sheath flow channel, and
   a bend in front of the flow merging section bends around at an acute angle, and a downstream side of the bend is arranged along a direction intersecting with a flow channel direction of the sample fluid.

5. A measurement device comprising:
   the flow cell of claim 1;
   an imaging mechanism that is disposed to face a wall of the flattened section contiguously formed to the first wall of the sample flow channel, and that images the sample fluid flowing in the flattened section;
   a sample supply mechanism that supplies the sample fluid to the sample flow channel; and
   a sheath supply mechanism that supplies the sheath fluid to the sheath flow channel.

6. The measurement device of claim 5, wherein, in the flattened section imaged by the imaging mechanism, the sample fluid flows in contact with the wall of the flattened section.

7. The measurement device of claim 5, wherein, in the flattened section imaged by the imaging mechanism, the sheath fluid is not interposed between the wall of the flattened section and the sample fluid.

* * * * *